Jan. 20, 1953 A. J. AVETTA ET AL 2,625,705
APPARATUS FOR EVISCERATING SHRIMP
Filed Dec. 2, 1949 3 Sheets-Sheet 2
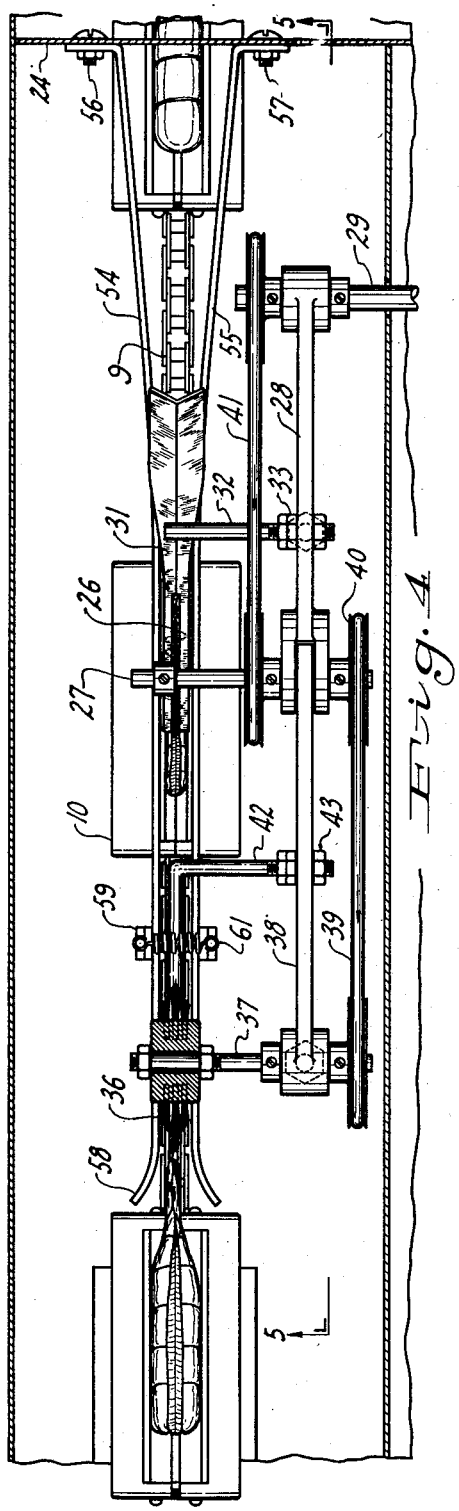
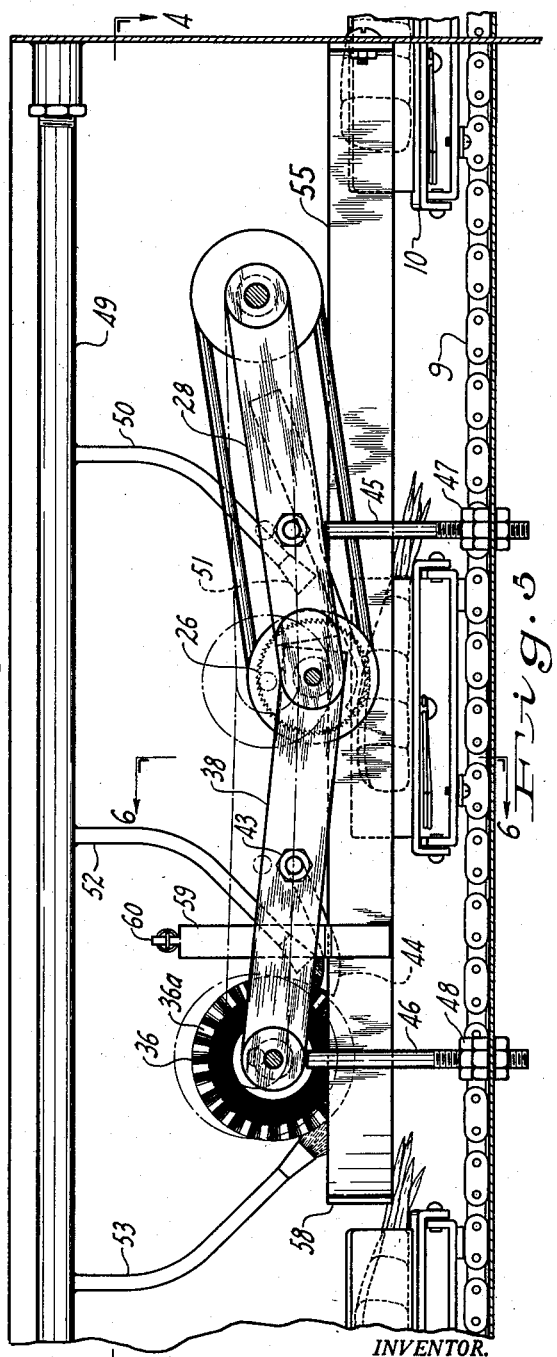
INVENTOR.
Albert J. Avetta
Theodore Scardamalia
BY
William B. Jaspert
Attorney.

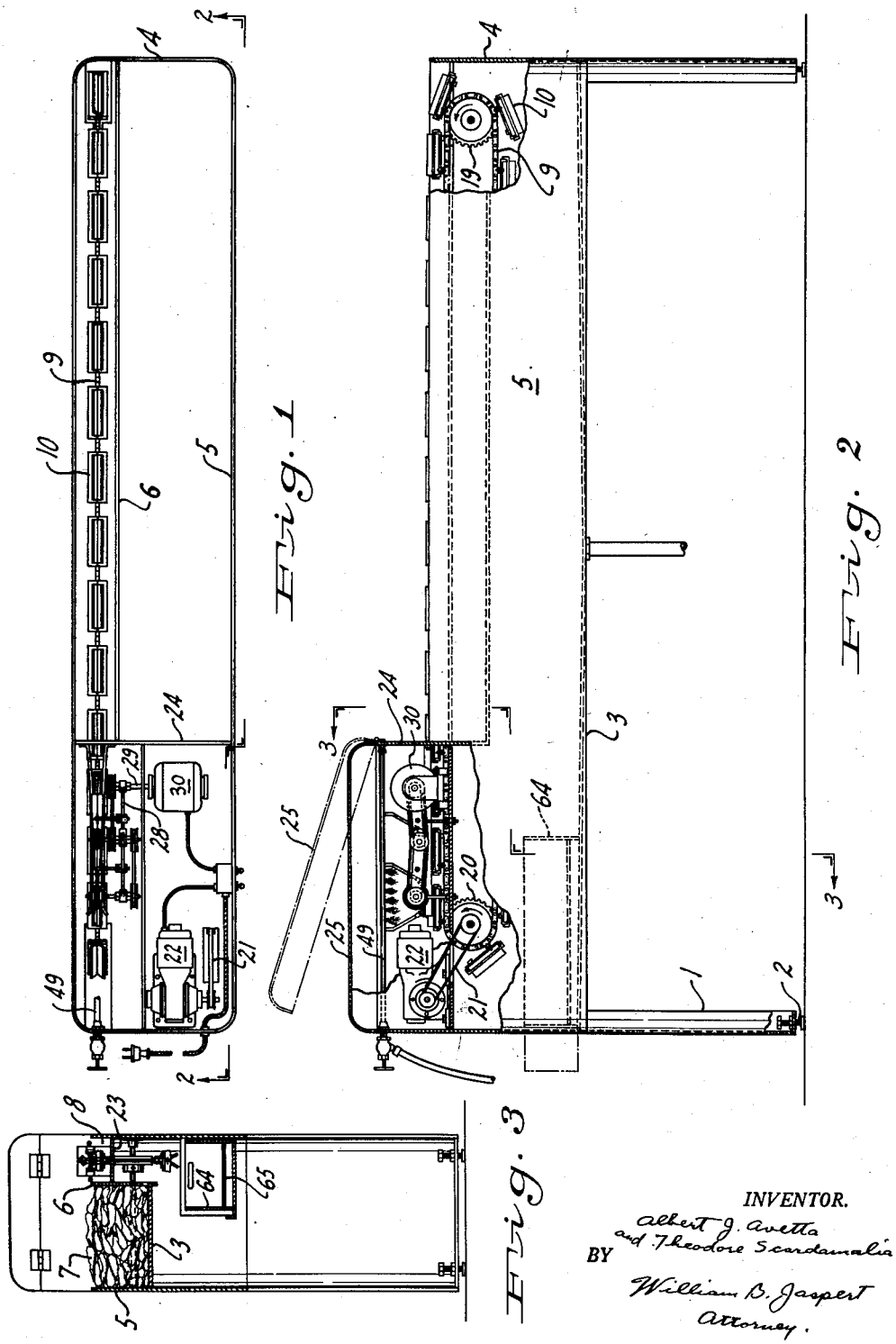

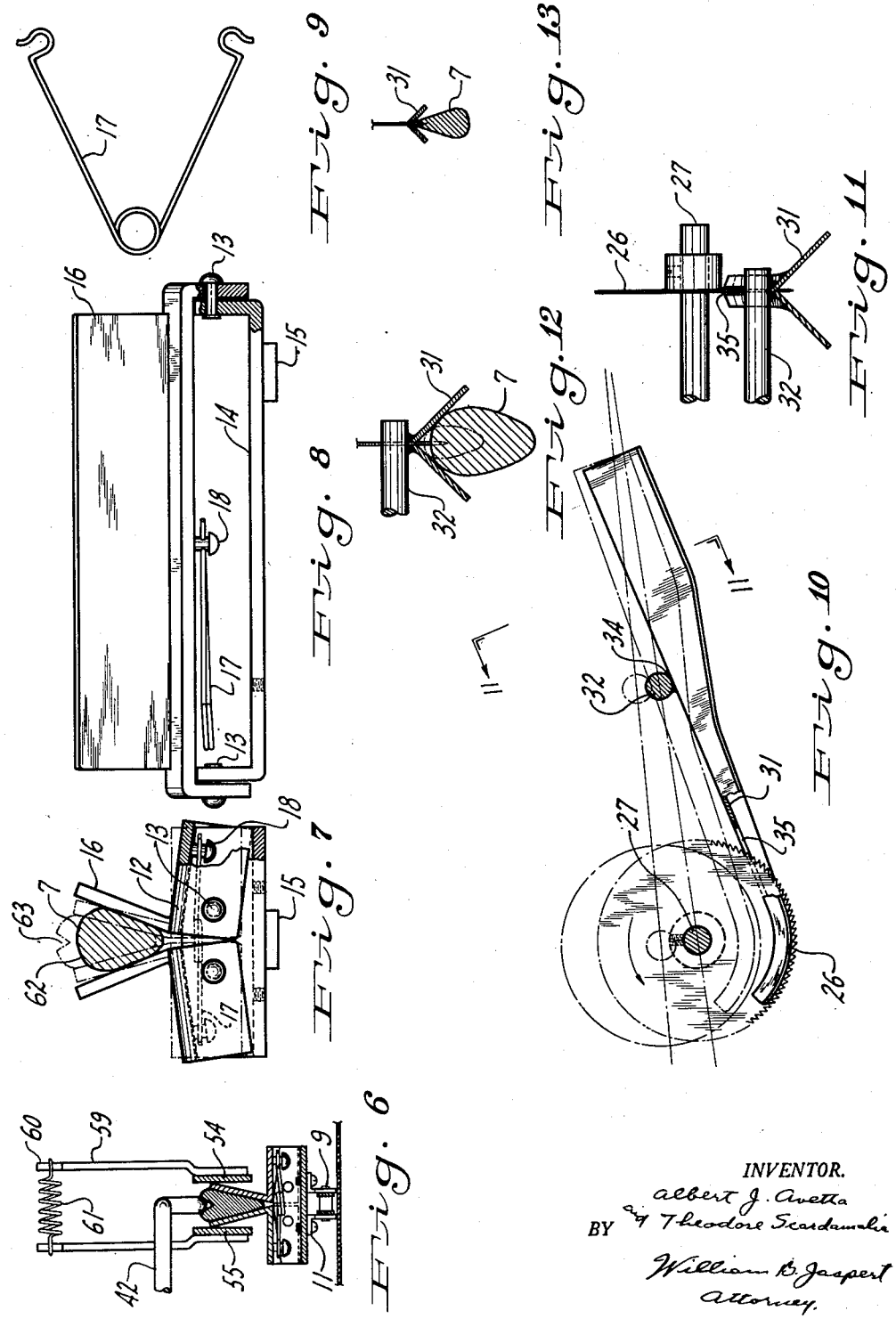

Patented Jan. 20, 1953

2,625,705

UNITED STATES PATENT OFFICE 2,625,705

APPARATUS FOR EVISCERATING SHRIMP

Albert J. Avetta and Theodore Scardamalia, Pittsburgh, Pa.; said Scardamalia assignor to said Avetta Application December 2, 1949, Serial No. 130,782

6 Claims. (Cl. 17—2)

This invention relates to new and useful improvements in apparatus for eviscerating shrimp, and it is among the objects thereof to provide apparatus of simple design and construction which shall be adapted to convey raw shrimp to the eviscerating devices by the use of an endless conveyor having gripping devices upon which the shrimp is laid and which by means of guide members clamp the shrimp body in such manner as to place the body under compression and tension stresses to firmly grip it while acted upon by the eviscerating cutter and brush and to automatically split open the cut portion to expose it to the cleaning brush and cleaning fluids, and which shall automatically release the shrimp when the evisceration has been completed.

It is a further object of the invention to provide adjustable means for regulating the depth of the cut and to provide for steering the cutter and brush to follow the contour of the shrimp.

It is still a further object of the invention to provide conveying means for the shrimp that shall be normally open and which shall be closed to exert a clamping action on the shrimp body when it enters the eviscerating portion of the machine.

A still further object of the invention is to provide a special rotary brush for cleansing the cut shrimp which will keep the bristles from clogging and produce a clean brushing action that will completely remove what is commonly known as the vein of the shrimp after it has been cut.

These and other objects of the invention will become more apparent from a consideration of the accompanying drawings, constituting a part hereof, in which like reference characters designate like parts, and in which:

Fig. 1 is a top plan view of a shrimp eviscerating machine embodying the principles of this invention;

Fig. 2 a side elevational view thereof partially in cross-section, taken along the line 2—2, Fig. 1;

Fig. 3 a transverse cross sectional view, partially in elevation, taken along the line 3—3, Fig. 2;

Fig. 4 an enlarged top plan view of the eviscerating mechanism of the machine shown in Figs. 1 and 2, taken along the line 4—4, Fig. 5;

Fig. 5 a side elevational view, partially in cross section, taken along the line 5—5, Fig. 4;

Fig. 6 a cross-sectional view, partially in elevation, taken along the line 6—6, Fig. 5;

Fig. 7 an end elevational view of a portion of the conveyor gripping means partially in cross section;

Fig. 8 a side elevational view of the device shown in Fig. 7, partially in cross section;

Fig. 9 a top plan view of a spring employed in the gripping devices of Figs. 7 and 8;

Fig. 10 a side elevational view, partially in cross section, of a saw guide and guard for regulating the depth of the eviscerating cutter and centering shrimp in the shrimp chucks;

Fig. 11 a cross-sectional view of the guard of Fig. 10, taken along the line 11—11 of Fig. 10;

Fig. 12 a cross-sectional view of a portion of the guard of Fig. 10 including a section through the shrimp body; and Fig. 13 a cross-sectional view of a portion of the guard of Fig. 10 and a portion of the cutting saw taken at the small end of the shrimp body as it passes under the eviscerating cutter.

With reference to the several figures of the drawings, the numeral 1, Fig. 2, illustrates a plurality of vertical supports with levelling screws 2 for supporting a trough-like table 3 with housing walls 4 and 5. The trough is divided by a partition wall 6 to form a bin for receiving fresh raw shrimp 7, as shown in Fig. 3, and to form a conveying channel 8 through which passes an endless conveyor chain 9 carrying shrimp gripping members which, for convenience, may be termed shrimp chucks 10, which are attached to the chain 9 by flanges 11 as shown in Fig. 6 of the drawings. The shrimp chucks 10, as shown in Figs. 6 to 8, consist of angle brackets 12 pivoted at 13 to a bar 14 which is attached to the flanges 11 of the chain 9, lugs 15 being provided underneath the bars to level them on the chain. The jaws 16 constitute the gripping elements for engaging the shrimp 7, and the hairpin spring 17 of Fig. 9 is attached to the rivet lugs 18 to normally hold the jaws 16 to their open position, in which position the shrimp 7 is placed between the jaws with the large end forward in the direction of travel of the chain 9.

As shown in Fig. 2, the conveyor chain 9 passes over a sprocket wheel 19 at the rear end of the machine and over a sprocket wheel 20 at the fore-end of the machine, the latter being driven by a T-belt 21 or in any other suitable manner from a motor 22. In the direction of the driving wheel 20 shown by the arrow, the upper reach is in tension and the bottom reach is the idle or return reach. A dividing partition wall 23, Fig. 3, supports chain 9.

The fore-end of the apparatus, as shown in Figs. 1 to 3, has an offset housing 24 and a hinged cover 25 and houses the eviscerating apparatus which is shown in the enlarged views of Figs. 4 and 5 and which consists of a cutter 26 mounted on shaft 27 that is carried on an arm or link 28 mounted on shaft 29 of a drive motor 30. The cutter is in the shape of a circular saw having cutting teeth and is provided with a combined guard and guide member 31 which is attached to a bar 32 that is secured by nuts 33 to the link 28. The bar is secured to the guard 31 by welding as shown at 34, Fig. 10. By loosening the nuts 33, the guard may be tilted about the axis of the rod 32 and by adjusting the nuts 33 it may be centered with reference to the cutting saw 26. The guard 31 is V-shaped, as shown in Figs. 4 and 11, and is curved somewhat complementary to the radius of the saw as shown in Fig. 10. The apex of the V walls of the guard 31 is slotted at 35 all the way through the curved end to provide saw clearance.

As shown in Figs. 4 and 5, a circular brush 36 is rotatably mounted on a shaft 37 carried by an arm or link 38 that is pivotally mounted on the shaft 27 of the cutting saw, the two links 28 and 38 constituting an articulated mount for the saw 26 and brush 36 so that they may move vertically independently of one another. Shaft 37 is driven by a V-belt 39 from a sheave wheel 40 that rotates with the shaft 27. Thus both the cutter and brush are driven by the motor 30 through the belts 39 and 41. Mounted on the link 38 is a guide bar 42 secured to the link by screw nuts 43. The guide bar is preferably round and is bent at right angles as shown in Fig. 4. The bent portion of the guide bar 42 lying in the axis of travel of the conveyed shrimp is slightly curved, as shown in the dotted lines at 44, Fig. 5. Arms 28 and 38 have adjustable abutting stops 45 and 46, respectively, having adjusting nuts 47 and 48 whereby the lower position of arms 28 and 38 may be regulated. A water supply manifold 49 is provided above the saw and brushes and has conduit arms 50 with a jet nozzle 51 for supplying a stream of water directly on the cutting saw to keep it cleared of the flesh cuttings. Similar conduits 52 and 53 deliver the washing fluid to both sides of the brush 36.

An important feature of this invention is the use of a pair of guide rails or arms 54 and 55 Fig. 4, which have one end bent at right angles for clamping by screws 56 and 57 to the end wall 24 of the offset housing.

The guide rails 54 and 55 are bent to form a Y for a portion of their length, and then to form a parallel track for the remaining portion of their length until they flare as shown at 58, Fig. 4 of the drawings. The guide rails are provided with uprights 59 having posts 60 that secure the eyelet ends of a coil spring 61 which maintains proper clamping tension on the guide bars 54 and 55. The spacing of the guide rails 54 and 55 is such that when a shrimp chuck passes into the Y-shaped portion of the guide rails, the rails will contact the flared walls or gripping faces 16 of the chucks and will compress the body of the shrimp between the jaws 16 into a substantially V-shape, as shown in Fig. 7. This clamping action, by virtue of the clamping brackets 12 being pivoted at 13, produces a compression of the flesh of the shrimp in the bottom of the V-like jaws and also a surface tension on the upper or back portion of the shrimp designated by the numeral 62. When the shrimp is ripped by the cutting saw 26, the tension on the back 62 will cause it to spread, as shown by the V 63, Fig. 7, a guide bar 42, Fig. 6, being provided to ride in the cut flesh to raise the brush 36, the clamping jaws 16 being held in closed position by the guide rails 54 and 55 until they have passed the flared ends 58 of the guide rails when the eviscerating operation has been completed.

The relation of the cutting saw 26 and the guide and guard member 31 is more clearly shown in Figs. 10 to 13. The largest part of the V-walls of the guard is shown in Fig. 11 which is a section along the line 11—11 of Fig. 10. When the back of the shrimp being conveyed to the saw guard strikes the guard, it will begin to lift the guard 31 which carries with it the cutter by virtue of the guard arm 32 being fastened to the pivot link 28, so that when the shrimp get to the cutting edge of the saw 26, it will have lifted the guard automatically to actuate the cutting saw to any sized shrimp that may pass therebeneath.

As previously explained, the depth of cut is regulated by adjustably tilting the guard 31 on the supporting arm 32 by loosening nuts 33. As shown in Fig. 12, the shrimp is guided into the saw by the guide 31 and the weight of the cutter and its supporting mechanism holds the guard 31 on top of the shrimp which further aids in holding the shrimp in the vice of the clamping jaws and prevents displacement of the shrimp body when the cutter acts upon it. As shown in Fig. 13, the small or tail end of the shrimp will also be contacted by the small end of the guard 31 as it passes beneath the saw.

With reference to Figs. 4 and 5 of the drawings, the brush 36 is made of three rows of bristles, the center row being of longer bristles than the two side rows, and as shown in Fig. 5, the bristles are set to provide spaces 36a to permit the brush to free itself of the brushed materials through the action of the fluid sprays on opposite ends of the brush.

The above described eviscerating mechanism operates briefly as follows.

With reference to Fig. 7, the operator, who stands on the trough side of the device, loads the shrimp on the machine by simply laying them in the vice-like jaws 16 of the chucks. As the endless conveyor chain is energized and the charging of the machine is continually conducted during the operation of the apparatus, the conveyor chain 9 will carry the shrimp chucks forward in the direction of the eviscerating apparatus at the fore-end of the machine. As the chucks enter the clamping channels 54 and 55, the jaws 16 will be contracted to positively and securely clamp the shrimp bodies therebetween, placing the upper portion or back that is acted upon by the saw in tension. As the shrimp is conveyed forward, it will engage the guard element 31 and fall within the V-walls until it reaches the circular cutting saw 26 which cuts a slot that spreads to a V as shown at 63, Fig. 7, by virtue of the tension on the back of the shrimp. When the shrimp body leaves the cutter, it will pass underneath the curved portion 44 of the guide arm 42 which keeps the flesh of the shrimp from adjusting itself to the clamping action of the jaws 16, until it reaches the brush 36 which cleans out the V-shaped cut 63 and removes the vein and other loose substance, such as cuttings from the shell that may have accumulated in the cut from the cutting action. When the shrimp chucks have passed beyond the flared ends 58 of the clamping rails 54 and 55, the spring 17 will operate the jaws 16 and as the chucks pass over the driving wheel 20, as shown in Fig. 2, the shrimp are dropped into a container designated by the numeral 64. This may have a screen bottom 65 to prevent its filling with the cleansing fluid which is running water. It is obvious that any receiving means may be employed, such as a conveyor instead of the member 64.

It is evident from the foregoing description of the invention that the apparatus provides a simple and positive way of gripping the shrimp when it passes into the eviscerating equipment and to grip it in such manner that the gripping force will cause the cut in the shrimp to spread to make it accessible to the brushing and further cleansing action, and such apparatus may be operated at relatively fast speeds to eviscerate the shrimp as fast as they may be conveyed underneath the cutting saw and brush. Several persons may be employed to load the shrimp chucks from the loading trough, so that all of the shrimp chucks will be charged as they pass into the eviscerating zone of the apparatus.

Although one embodiment of the invention has been herein illustrated and described, it will be evident to those skilled in the art that various modifications may be made in the details of construction without departing from the principles herein set forth.

We claim:

1. In apparatus for eviscerating shrimp, a frame, an endless conveyor mounted on said frame, a plurality of shrimp chucks mounted on said conveyor, each chuck comprising a pair of shrimp gripping members having inclined surfaces to form an open trough for laying the shrimp thereon, said gripping members being normally yieldingly biased to open position for receiving the shrimp, a slitting saw mounted on said frame above said endless conveyor, and a squeeze guide on said frame operatively associated with said shrimp gripping means adapted to engage the sides of the shrimp gripping members to thereby securely clamp the shrimp bodies therebetween while passing underneath the cutting saw.

2. In apparatus for eviscerating shrimp, a frame, an endless conveyor mounted on said frame, a plurality of shrimp chucks mounted on said conveyor, each chuck comprising pairs of juxtaposed clamping bars consisting of a pair of shrimp-gripping members pivotally mounted and having inclined surfaces to form an open trough for laying the shrimp thereon, said gripping members being normally yieldably biased to open position for receiving the shrimp, a slitting saw mounted on said frame above said endless conveyor, and a squeeze guide on said frame operatively associated with said shrimp gripping means adapted to engage the sides of the shrimp gripping members to thereby securely clamp the shrimp bodies therebetween while passing underneath the cutting saw.

3. In apparatus for eviscerating shrimp, a frame, an endless conveyor mounted on said frame, a plurality of shrimp chucks mounted on said conveyor, each chuck comprising a pair of shrimp gripping members having inclined surfaces to form an open trough for laying the shrimp thereon, said gripping members being normally yieldably biased to open position for receiving the shrimp, a slitting saw mounted on said frame above said endless conveyor, a guard for said saw, said guard having a V-shaped cross-sectional contour for engaging said shrimp and guiding it beneath said saw, and a squeeze guide on said frame operatively associated with said shrimp gripping means adapted to engage the sides of the shrimp gripping members to thereby securely clamp the shrimp bodies therebetween while passing underneath the cutting saw.

4. In apparatus for eviscerating shrimp, a frame, means for conveying the shrimp underneath the slitting saw comprising a conveyor mounted on said frame, a plurality of juxtaposed angularly inclined clamping jaws mounted on said frame, said jaws being disposed at an angle to form an open trough and being pivotally mounted, means for normally biasing the jaws to open position to receive a shrimp body therebetween, a saw mounted on an arm pivoted at one end mounted on said frame and carrying a guard having one end curved complementary to the circular shape of the saw, the guard being slitted to envelop both sides of the saw and being spaced from the outer periphery of the saw to determine the depth of the cut in the shrimp body, said guard functioning as a jaw for engaging the top of the shrimp body to subject the arm on which the saw is mounted to pivotal movement in response to the varying contour of the shrimp body passing therebeneath.

5. In apparatus for eviscerating shrimp, a frame, an endless conveyor having shrimp chucks comprising pairs of juxtaposed clamping bars angularly disposed and pivotally mounted on the conveyor mounted on said frame, said jaws forming open troughs for receiving the frame, a saw for cutting the backs of the shrimp disposed in the path of travel of the conveyor mounted on said frame, and a squeeze guide comprising a pair of guide rails fixed at one end and open at the other, said rails being angularly disposed to form a Y-shaped path in which the shrimp pass in contact with the rails but said rails being free at one end and being biased to each other to exert clamping pressure on the shrimp-engaging clamps preliminary to and while passing through the cutting region of the saw.

6. In apparatus for eviscerating shrimp, a frame, an endless conveyor mounted on said frame, a plurality of shrimp chucks mounted on said conveyor, each chuck comprising a pair of shrimp gripping members having inclined surfaces to form an open trough for laying the shrimp thereon, a water supply pipe disposed above said shrimp chucks and adapted to direct streams of water thereon, a slitting saw mounted on said frame above said endless conveyor, and a squeeze guide on said frame operatively associated with said shrimp gripping means adapted to engage the sides of the shrimp gripping members to thereby securely clamp the shrimp bodies therebetween while passing underneath the cutting saw.

ALBERT J. AVETTA.
THEODORE SCARDAMALIA.

REFERENCES CITED

The following references are of record in the file of this patent:

UNITED STATES PATENTS

| Number | Name | Date |
| --- | --- | --- |
| 2,110,416 | David et al. | Mar. 8, 1938 |
| 2,299,774 | Weems | Oct. 27, 1942 |
| 2,301,729 | Krull | Nov. 10, 1942 |